United States Patent [19]

Peachee, Jr.

[11] Patent Number: 4,499,661
[45] Date of Patent: Feb. 19, 1985

[54] METHOD OF FABRICATING DIE CAST ROTOR WITH ONE PIECE OIL RETURN/ROTOR SHAFT SECUREMENT MEMBER

[75] Inventor: C. Theodore Peachee, Jr., St. Louis County, Mo.

[73] Assignee: Emerson Electric Co., St. Louis, Mo.

[21] Appl. No.: 570,669

[22] Filed: Jan. 13, 1984

Related U.S. Application Data

[60] Continuation of Ser. No. 416,233, Sep. 9, 1982, abandoned, which is a division of Ser. No. 358,477, Mar. 15, 1982, abandoned.

[51] Int. Cl.³ ............................................. H02K 15/02
[52] U.S. Cl. ..................................... 29/598; 164/110; 164/DIG. 10; 310/42; 310/90
[58] Field of Search ................. 29/596, 598, 148.4 L; 164/DIG. 10, 110; 310/42, 90; 384/408–413, 402, 397

[56] References Cited

U.S. PATENT DOCUMENTS

| | | | |
|---|---|---|---|
| 2,053,425 | 9/1936 | Else | 384/412 X |
| 3,754,844 | 8/1973 | Nusser et al. | 417/423 R |
| 4,045,698 | 8/1977 | Morrill | 310/90 X |
| 4,209,722 | 6/1980 | Peachee | 310/90 |

Primary Examiner—Carl E. Hall
Attorney, Agent, or Firm—Polster, Polster and Lucchesi

[57] ABSTRACT

A die cast rotor for an electric motor in which an integral tubular oil return/rotor shaft mounting member is sealingly cast-in-place within the body of the rotor. The integral oil return/rotor shaft mounting member is preferably a one-piece impact extruded member. A method of fabricating such a die cast rotor is also disclosed.

2 Claims, 6 Drawing Figures

U.S. Patent   Feb. 19, 1985   4,499,661
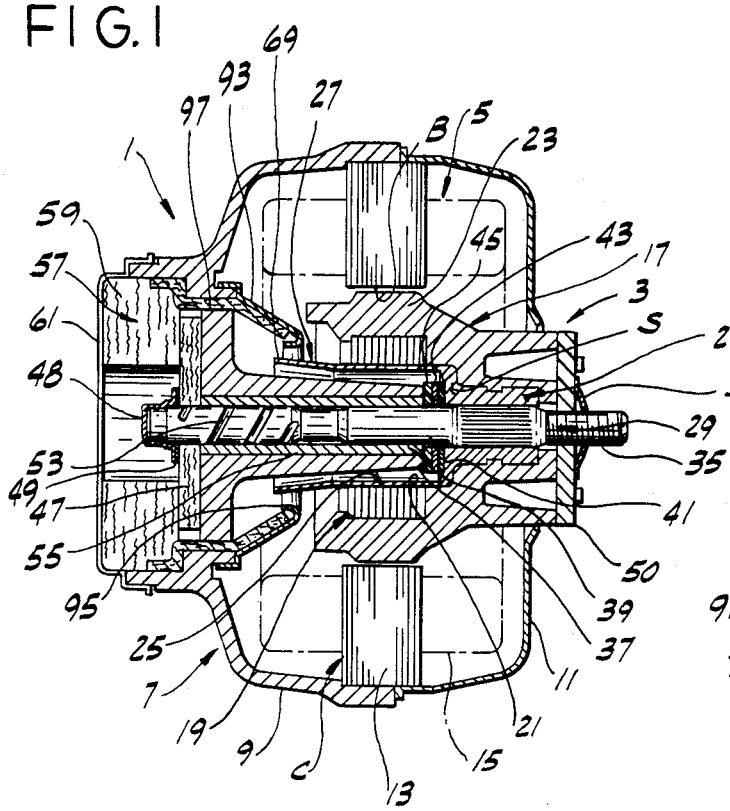
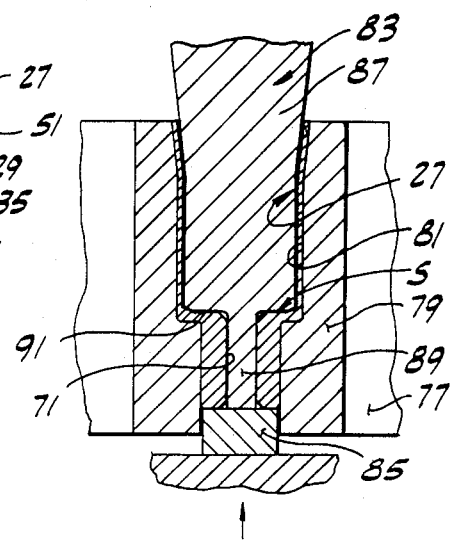
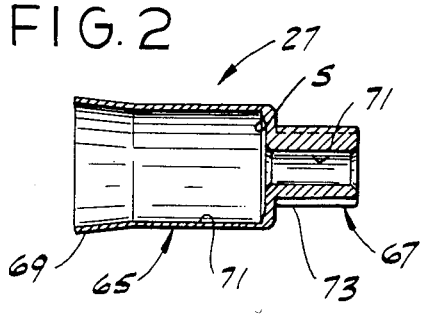
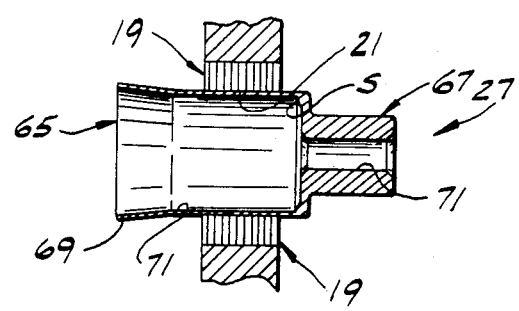
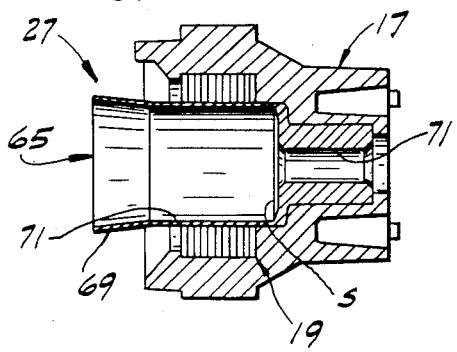
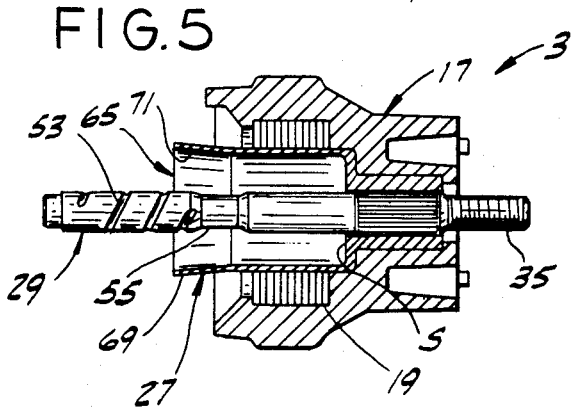

METHOD OF FABRICATING DIE CAST ROTOR WITH ONE PIECE OIL RETURN/ROTOR SHAFT SECUREMENT MEMBER

This is a continuation of application Ser. No. 416,233, Sept. 9, 1982, now abandoned, which in turn is a division of application Ser. No. 358,477, filed Mar. 15, 1982, now abandoned.

BACKGROUND OF THE INVENTION

This invention relates to a rotor assembly for an electric motor or the like, and more particularly to a die cast, squirrel cage rotor having a tubular oil return member sealingly cast-in-place within the rotor.

In certain dynamoelectric machines of the induction motor type, and particularly in many smaller motors sometimes referred to as unit bearing motors, the motors have a squirrel cage rotor assembly in which the conductor bars for the rotor and the body of the rotor are made of die cast aluminum. Typically, these rotor assemblies include a stack or rotor core of individual laminations constructed from suitable ferro-magnetic material. Each lamination has a central opening and a plurality of so-called satellite openings adjacent its outer margin. The laminations are assembled in a stack and the laminations are rotated slightly with respect to one another in the stack so that their central openings are coaxial but so that their satellite openings are skewed relative to one another and so that the satellite openings constitute slots. The lamination stack or core is then placed in a suitable die casting mold and molten aluminum is injected under pressure into the mold so as to surround the core, to fill the mold, and to flow through the skewed slots in the core formed by the satellite openings so as to form the conductor bars of the rotor. These die cast squirrel cage rotors typically have a central opening therethrough and a rotor shaft extending through this opening which is rigidly secured to the rotor so that the shaft rotates with the motor. This central opening may be defined at least in part by the central opening of the laminations and is appreciably larger than the shaft so as to receive a rigid boss of the motor housing. The rotor shaft is received in an opening in the boss and is journalled therein by a suitable journal bearing or the like so as to rotatably support the rotor on the motor housing. As is typical, a portion of the rotor shaft journalled in the bearing has a helical oil groove formed on its outer surface and the outer end of the shaft rotates in a felt wick supplied with lubricating oil from a reservoir. Upon rotation of the rotor, the oil grooves in the shaft pick up oil from the wick and move it along the length of the bearing to lubricate it. Upon the oil being discharged from the inner end of the bearing, it is slung outwardly by the centrifugal force of the rotating rotor shaft.

In prior art motors having such rotors, a return system was provided for recirculating the oil to the oil supply reservoir. This oil return system typically included a tubular oil return member which was fitted into the opening in the rotor after die casting. This oil return member surrounded the bearing boss and extended out beyond the end of the rotor. The inner end of this oil return member was sealed to the rotor body by application of a sealant. An outer end cap carried by the motor housing surrounded the outer end of the oil return member and collected oil which flowed out the end of the oil return member from the inside of the rotor.

In the manufacture of these prior art die cast squirrel cage rotors, it has heretofore been difficult to fit the oil return member into the rotor body and to seal the inner end of the oil return member to the rotor body. As mentioned above, the sealing operation usually involved the application of a sealant to the joint between the inner end of the oil return member and the rotor body. However, many of the motors which incorporated these die cast squirrel cage rotors were relatively small and the space in which the sealant had to be applied was cramped. Also, the application of sealant was a messy and time consuming operation performed after die casting of the rotor thus resulting in increased labor costs for the manufacture of the motor.

In my prior coassigned U.S. Pat. No. 4,209,722, a die cast rotor is disclosed in which a tubular oil return member is sealably die cast-in-place within the rotor body. However, this die cast-in-place oil return member was separate and apart from a securement member which was also die cast-in-place within the rotor body, this securement member receiving and rigidly securing the rotor shaft to the rotor body. Typically, this rotor shaft securement member was made of brass. During die casting of the rotor, it was necessary to separately locate or place both the oil return tube and the rotor shaft securement member in the die cavity of the die casting machine. The placement of these two parts required a certain degree of skill and time on the part of the operator of the die casting machine.

Reference may be made to U.S. Pat. Nos. 2,524,555, 3,121,179, 3,420,335, 3,486,050 and 4,045,698 and to West German Pat. No. 2,502,778 for prior art reference in the same broad field as the present invention.

SUMMARY OF THE INVENTION

Among the several objects and features of this invention may be noted the provision of a die cast squirrel cage rotor, such as above described, in which the tubular oil return member and the rotor shaft securement member are integral with one another and in which they are die cast-in-place in the rotor body;

The provision of such a rotor which is appreciably faster and easier to manufacture than similar prior art rotor assemblies;

The provision of such a rotor assembly and method of fabricating a rotor assembly which eliminate the requirement of having to place two separate parts (i.e., the oil return tube and the rotor shaft securement member) in the die cavity of the die casting machine;

The provision of such a rotor in which the oil return tube of said integral oil return/rotor shaft securement member serves as a locator for the rotor core in the die cavity of the die casting machine;

The provision of such a rotor assembly in which selected surfaces of the oil return/rotor shaft securement member serves as a portion of the mold for forming a portion of the rotor body during die casting; and The provision of such a rotor which is economical to manufacture, which reduces scrap in the formation of the oil return/rotor shaft securement member, and which is reliable in operation.

Briefly stated, a rotor assembly of the present invention for an electric motor and the like has a rotor body of die cast metal, a core comprising a stack of laminations of suitable ferromagnetic material, and central longitudinal axis about which the rotor assembly is rotatable when installed in the motor. The rotor further has a central opening extending substantially coaxially with the central longitudinal axis and an axial rotor shaft fixably secured to the rotor body and extending out through the central opening of the rotor body. An integral oil return/rotor shaft mounting member is die cast in place within the rotor body. The integral oil return/rotor shaft mounting member comprises an oil return tube having an outer surface of larger diameter than the rotor shaft with at least a portion of the rotor shaft being surrounded by this oil return tube. Further, the oil return tube is in engagement with portions of the rotor core forming the central opening therethrough. The rotor shaft securement portion of the integral oil return/rotor shaft securement member has a central opening therethrough of smaller diameter than the rotor shaft whereby the rotor shaft is fixably secured to the rotor shaft mounting member thereby to fix the rotor body to the shaft. The outer surface of the oil return tube and of the rotor shaft securement member is directly engageable with the die cast rotor body and constitute die casting mold surfaces for at least selected portions of the die cast rotor body during die casting.

The method of this invention of fabricating a rotor assembly for an electric motor, such as described above, comprises the steps of forming an integral oil return tube/rotor shaft mounting member. The rotor core is placed on the outside of the oil return tube at a predetermined position therealong and the rotor core together with the integral oil return tube/rotor shaft mounting member are placed within the die cavity of a die casting machine. Then, molten metal is die cast around the integral oil return tube/rotor shaft mounting member and around the core so as to die cast these elements in place within the die cast rotor body. The rotor shaft is inserted in and is fixedly secured to the rotor shaft mounting member.

Other objects and features of this invention will be in part apparent and in part pointed out hereinafter.

BRIEF DESCRIPTION OF THE DRAWINGS

FIG. 1 is a longitudinal cross sectional view of a so-called unit bearing electric motor having a rotor assembly of the present invention installed therein;

FIG. 2 is a longitudinal cross sectional view of an integral oil return tube/rotor shaft mounting member of the present invention;

FIG. 3 is a view of the oil return member/rotor shaft mounting member, as shown in FIG. 2, with the rotor core received on the outside of the oil return tube at a predetermined position therealong;

FIG. 4 is a longitudinal cross sectional view of the parts shown in FIG. 3 with the rotor body die cast-in-place around selected outer surfaces of the core and the oil return tube/rotor shaft mounting member;

FIG. 5 is a longitudinal cross sectional view of the rotor assembly shown in FIG. 4 with the rotor shaft fixedly mounted in the rotor shaft mounting member; and FIG. 6 is a part diagrammatic longitudinal cross sectional view of the forming dies of a cold extrusion press utilized to form the integral oil return tube/mounting member shown in FIG. 2.

Corresponding reference characters indicate corresponding parts throughout the several views of the drawings.

DESCRIPTION OF A PREFERRED EMBODIMENT

Referring now to the drawings a squirrel cage electric motor, as indicated in its entirety at 1, is shown to include a die cast rotor assembly 3 of this invention mounted for rotation within a stator assembly 5. More specifically, motor 1 is a so-called unit bearing motor having a motor housing 7 including a rigid, cast body 9 and a cover 11 secured to the body. Stator assembly 5 is shown to include a stack of steel or soft iron lamination plates 13 constituting a stator core C. The core has a bore B therein and blind slots (not shown) extending outwardly from the bore for reception of coils of wire, as shown in phantom and as indicated at reference character 15, constituting the windings of the stator.

Rotor assembly 3 of this invention is preferably a die cast squirrel cage rotor having a body 17 of die cast aluminum or other suitable electrically conductive material. Cast-in-place within body 17 is a core or stack of laminations, as indicated at 19. As is typical, each of these laminations has a central opening 21 and a plurality of so-called satellite openings (not shown) adjacent its outer margin. As is typical, the laminations are rotated relative to one another in the core so that the satellite openings form skewed slots. With the laminations assembled in a stack, with the central openings of the laminations coaxial, and with each of the laminations being rotated relative to the adjacent laminations in the stack, the satellite openings form skewed slots. The rotor core 19 is positioned in a die casting mold (not shown), and molten aluminum is forced into the mold under pressure so as to surround the rotor core and to fill the mold so as to form the rotor body 17. Additionally, the molten aluminum fills the slots in the rotor core so as to form rotor conductor bars 23. These rotor conductor bars are integral with other portions of the rotor body at the ends of the rotor core and these last-mentioned portions constitute end rings for the rotor. Rotor assembly 3 further has a longitudinal central opening 25 extending therethrough. Central opening 21 of core 19 constitutes a portion of rotor body central opening 25.

As generally indicated at 27, an integral oil return/rotor shaft securement member is die cast-in-place in rotor body 17. As shown in FIGS. 1 and 5, a rotor shaft 29 is fixedly secured within integral member 27 and the shaft extends out beyond both ends of the rotor. The right end of the shaft is threaded, as indicated at 35, for attachment of a fan or the like, and the left end of the shaft is adapted to be received in a bearing for journalling the rotor for rotation about the longitudinal axis of the shaft.

More particularly, motor body 9 has a central bearing boss 37 extending inwardly into the motor. Boss 37 has a bushing or journal bearing 39 therein for reception of a portion of shaft 29 so as to journal rotor assembly 3 in the motor housing. Boss 37 is rigid and thus serves as a support for the rotor. Since motor 1 has only a single bearing, it is oftentimes referred to as a unit bearing motor.

As indicated at 41, a nylon spacer washer surrounds shaft 29 adjacent a shoulder S in integral member 27. A thrust washer 43 also surrounds the shaft and faces toward the inner end of boss 37, and a cushion washer 45 of rubber or the like is disposed between the spacer washer and the thrust washer. A washer 47 of suitable wick material surrounds the outer end of shaft 29 and bears against the outside of body 9. A push nut 48 is applied to the outer end of shaft 29 with a thrust washer 49 is disposed between the push nut and wick washer. Thus, push nut 48 securely holds rotor assembly 3 within body 9. A hub washer 50 covers one end (i.e., the right end) of rotor body 17. This hub washer is shown to be secured in place by a speed nut 51 threaded on shaft 29.

Shaft 29 has a helical oil groove 53 formed thereon and is undercut, as indicated at 55. A lubricating oil reservoir, as generally indicated at 57, is provided on the motor for supplying lubricating oil to shaft 29 for lubrication of the journal bearing 39. This oil reservoir is shown to comprise a storage wick 59 held in place on body 9 by means of a cap 61. Storage wick 59 holds a quantity of oil and is in lubricating communication with washer wick 47 for feeding oil thereto. Wick washer 47 is in engagement with shaft 29 which passes therethrough and feeds oil onto the shaft. Oil grooves 53 on the shaft pick up oil from wick washer 47 and feed it along the length of the shaft for lubricating bearing 39 when the shaft is rotated. Oil fills the undercut portion 55 of the shaft and is forced over the remainder of the length of the shaft upon additional oil being forced into the undercut area by the oil groove. As oil is forced out of the inner end of bearing 39, it is flung outwardly by the centrifugal force of the rotating rotor shaft.

In accordance with this invention, integral oil return tube/rotor shaft mounting member 27 includes an oil return tube 65 and a rotor shaft mounting member 67, as best shown in FIGS. 2-5. As is most clearly shown in FIG. 2, it will be seen that, in accordance with this invention, oil return tube 65 is integral with the rotor shaft mounting member 67. Preferably, integral member 65 is formed by a cold extrusion process that will be hereinafter described in detail in regard to FIG. 6.

Oil return tube 65 includes a flared outer end 69 and an inner opening 71. Shoulder S constitutes the base of the oil return tube. As is best shown in FIG. 5, oil return tube opening 71 is of a substantially larger diameter than the cross section of rotor shaft 29. The outer surface of rotor shaft mounting member 67 has a plurality of longitudinal or axial flutes 73 on its outer surface so as to positively fix member 65 against rotation relative to rotor body 17 when it is die cast-in-place within the rotor body.

Referring now to FIG. 6, one way of forming integral member 27 of this invention will now be described. Specifically, integral member 27 is formed by forging a slug (not shown) of a suitable aluminum alloy. A cold extrusion press (not shown) includes a fixed bed (also not shown) on which a lower die ring 77 is fixably mounted. A die 79 is mounting within die ring 77, the die having a die cavity 81 generally of the desired shape of the outer surfaces of integral member 27. The movable head of the cold extrusion press carries a punch 83 which is vertically reciprocable between a raised retracted position (not shown) in which a slug may be placed in die cavity 81 and in which a finished part 27 may be ejected from the die cavity by means of a knockout pin 85 carried by the fixed bed of the press, and an extruding position (as shown in FIG. 6) in which the punch and the die cooperate to form the part. Punch 83 includes an enlarged portion 87 for forming the inside surfaces of oil opening 71 and a punch nose 89 which forms the axial shaft receiving opening 75 in shaft mounting member 67. A transition shoulder 91 between the enlarged and nose portions of punch 81 form shoulder S on integral member 27. The draft on both die cavity 81 and on punch 83 are such that, after formation of part 27, the punch may be readily withdrawn from the interior of the part and the part may be readily ejected from the die cavity upon operation of knockout pin 85. Of course, it will be understood that the portion of die cavity 81 forming the outer surface of rotor shaft securement member 67 has longitudinal flutes formed thereon so as to form flutes 73 on integral member 27.

Alternatively, and preferably, member 27 is formed by die 79 and punch 83 in the manner described above, except punch 83 does not have punch nose 89 on its lower end so that opening 71 is not formed simultaneously upon forging of member 27. Instead, after the forged member 27 has been formed, opening 71 is drilled in the shaft mounting portion 67 utilizing any convention drilling method.

It will be understood that because the starting slug is accurately formed so as to contain the nominal amount of metal to form part 27, virtually all of the slug is consumed and the scrap is minimal. Further, those skilled in the art will recognize that cold extrusion presses may be equipped with automatic slug and part transfer apparatus so as to facilitate high production rates. For example, in certain production cold extrusion presses, eighty or more parts 27 per minute may be fabricated.

In accordance with the method of this invention, an integral member 27 may be inserted into the central opening 21 of core 19 so that the core is securely fitted on the outside of oil return tube 65 at a predetermined axial location therealong. This step is shown in FIG. 3. With core 19 positioned on oil return tube 65, integral member 27 together with the core positioned thereon is placed in the mold cavity (not shown) of a conventional die casting machine. In this manner, it will be appreciated that integral member 27 serves as a mounting fixture for holding core 19 in an accurate, molding position within the die cavity during die casting.

Molten aluminum alloy may then be injected under pressure into the die cavity of the die casting machine so as to flow around selected portions (as defined by the shape of the die cavity) of integral member 27 and of core 19 so that upon solidification of the molten alloy, the core and member 63 are securely die cast-in-place within rotor body 17. After die casting, the rotor assembly 3, as shown in FIG. 4, is removed from the die casting machine.

Then, a knurled portion of rotor shaft 29 is pressed into opening 71 of rotor shaft mounting member 67 thereby to fixably secure the rotor shaft to rotor body 17.

It will be noted that because oil return tube 65 and rotor shaft mounting member 67 are integral, there is no possibility of the leakage of lubricating oil from the inside of the oil return tube past the rotor shaft mounting member on the outside thereof. Thus, the integral oil return tube/rotor shaft mounting member 27 does not require the die cast metal to contact the inside and the outside of the oil return member, as shown in my above-mentioned U.S. Pat. No. 4,209,722. Additionally, this integral member 27 eliminates the necessity of having to seal the oil return member with suitable sealants or the like, as was required by certain prior art oil return tubes.

As is conventional, motor 1 includes an end cap 93 secured to body 9. This end cap is formed of sheet metal or the like in the form of a truncated cone with its smaller end having an opening therethrough defined by an inwardly curled lip 95. This opening receives the outer flared end 69 of oil return member 67 and the inner surface of oil return member 67 and the inner surface of lip 95 is spaced from the outer surface of the oil return member. For applications in which motor 1 is intended to be oriented at any angle, an oil return wick 97 extends through body 9 so as to pick up oil which flows outwardly along the inside of the oil return member and which is flung outwardly from the open end of the latter as the rotor rotates and is caught by end cap 93. However, in other applications in which motor 1 is only intended for horizontal orientation of the axis of shaft 29, wick 97 may be omitted. The oil picked up by the return wick flows back to supply wick 59. Lip 95 prevents oil from escaping from the end cap into the motor.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of fabricating a rotor assembly for an electric motor, said rotor assembly having a central longitudinal axis about which it is rotated when installed in said motor, said rotor assembly comprising a die cast rotor body, a core comprising a stack of laminations of suitable ferromagnetic material, said core having a central opening therethrough, an oil return tube coaxial with said longitudinal central axis, a rotor shaft coaxial with said central longitudinal axis, and a rotor shaft mounting member fixed with respect to said rotor body and fixedly receiving said rotor shaft so that said rotor shaft is rotatable with said rotor body, said method comprising the steps of:

forming a one-piece oil tube and rotor shaft mounting member so that said oil tube and said rotor shaft mounting member are integral and so that the one piece member has a shoulder between said oil tube and said rotor shaft mounting member;

inserting said one-piece member into the central opening of said core so that the core is positioned on the outer surface of said oil return tube at a predetermined position therealong;

placing said core and said one-piece member in the die cavity of a die casting machine so that at least portions of said oil tube, said rotor shaft mounting member, and said shoulder of said one-piece member form die casting mold surfaces;

die casting molten metal around said one-piece member and around said core so as to die cast said one-piece member and said core in place within said die cast rotor body; and fixedly securing said rotor shaft to said rotor shaft mounting member of said one-piece member.

2. The method of claim 1 wherein said step of forming said one-piece oil return tube and rotor shaft mounting member comprises cold extrusion forming said one-piece oil return tube and rotor shaft mounting member.

* * * * *